United States Patent [19]

Brugman

[11] 4,062,098

[45] Dec. 13, 1977

[54] GUIDE ROLLER AND A METHOD OF MANUFACTURING SUCH A ROLLER

[75] Inventor: Hans Brugman, Ambt-Delden, Netherlands

[73] Assignee: Brugman Machinefabriek B.V., Almelo, Netherlands

[21] Appl. No.: 745,975

[22] Filed: Nov. 29, 1976

[30] Foreign Application Priority Data

Dec. 2, 1975 Netherlands ......................... 7514050

[51] Int. Cl.² ............................................. B21B 31/08
[52] U.S. Cl. ..................................... 29/123; 29/129.5; 29/132
[58] Field of Search .............. 29/132, 123, 110, 129.5, 29/130

[56] References Cited

U.S. PATENT DOCUMENTS

| 1,486,052 | 3/1924 | Stephenson | 29/123 |
| 1,495,243 | 5/1924 | Brandwood et al. | 29/123 X |
| 1,648,626 | 11/1927 | Smith | 29/123 X |
| 3,693,544 | 9/1972 | Trzyna | 29/132 X |

Primary Examiner—Alfred R. Guest
Attorney, Agent, or Firm—Stephen E. Feldman; Marvin Feldman

[57] ABSTRACT

A light-weight guide roller comprising a cylindrical jacket of stainless steel filled with synthetic foam material under pressure, both ends of the roller being closed by an annular box-shaped element constituted by a central trunnion with two oppositely positioned rings each having a U-shaped cross-section, said rings being welded to said trunnion and to said jacket.

3 Claims, 3 Drawing Figures

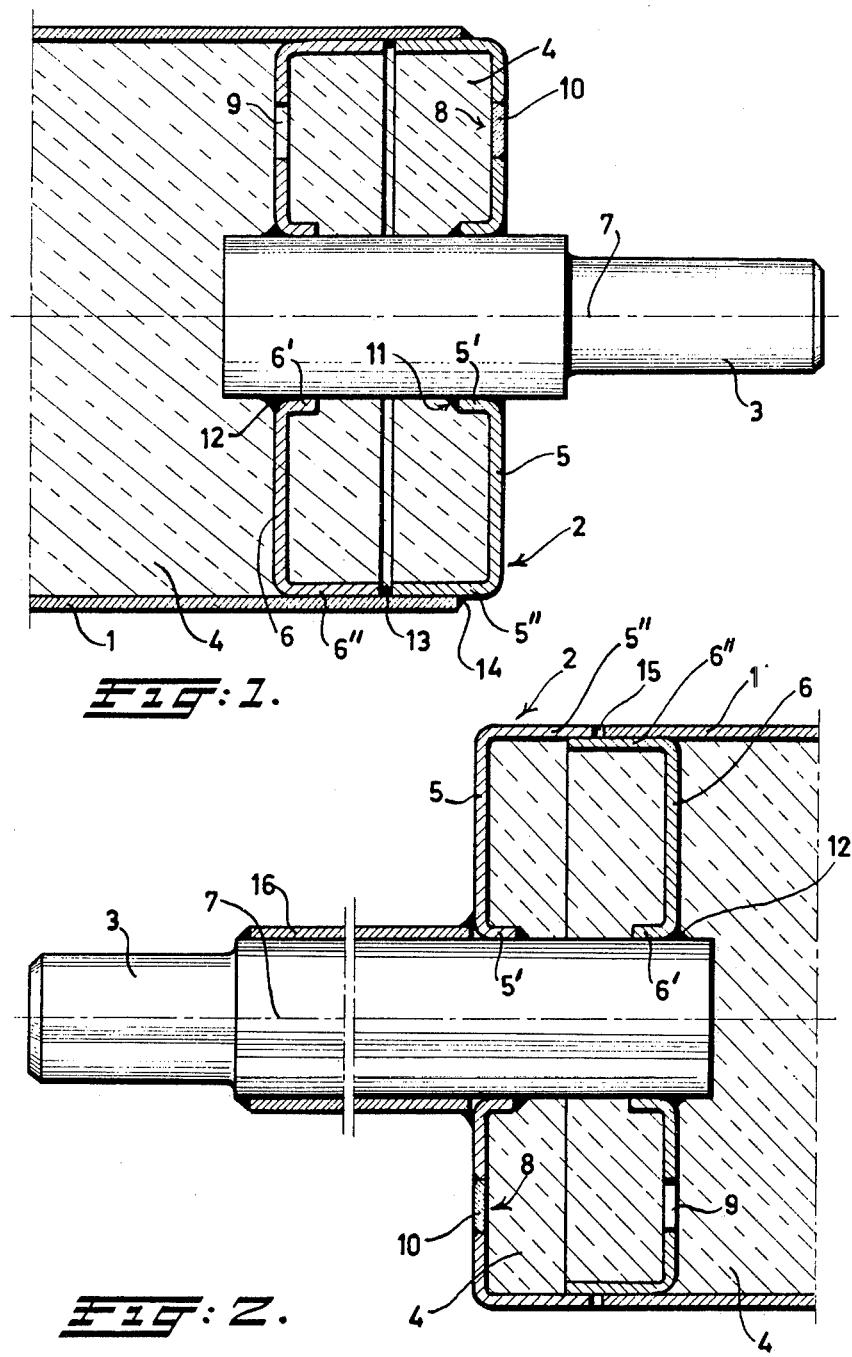

GUIDE ROLLER AND A METHOD OF MANUFACTURING SUCH A ROLLER

BACKGROUND OF THE INVENTION

This invention relates to a roller for guiding and/or conveying a web of material, like in a textile processing machine, said roller comprising a jacket of stainless steel with a filling of foam plastic and two end covers each provided with a trunnion. Such rollers are used in large quantities in machines for washing, chemically treating, drying etc textile material. Their usual dimensions are 150 mm in diameter and 2000 mm in length.

Owing to the aggresive medium by means of which the aimed treatment is often carried out, the roller has a jacket of stainless steel. Since this material is rather expensive, the jacket is made as thin as possible while a filling of foam plastic is used to impart sufficient strength and bending resistance to the roller. Thus the roller gets light in weight and has only a small mass. The roller should meet high requirements as to its precise cylindrical shape, since otherwise disturbing forces or influences would arise in the conveyed textile web with a risk of creases being formed or the like. The rollers in a textile processing machine are further subjected to a rather considerable load, owing to the pull exerted on them by the web of material to be guided.

In order to keep the rollers in good shape it is therefore of great importance that apart from sufficient strength and bending resistance, the two supporting trunnions at both ends of each roller are rigidly and efficiently secured. The foam plastic within each roller offers only little support in this respect, particularly in case of varying loads due to the rotation of the rollers. With respect to the above, various structural solutions have been proposed to anchor the supporting trunnions not only exactly centrally but also rigidly in the hart of the roller. These solutions have so far appeared to be inefficient or to use much labour, which prevented an extensive use of these rollers which are in great demand. Not only the strength but also the cost price of the roller are of importance.

SUMMARY OF THE INVENTION:

The invention aims to provide a roller structure and a manufacturing method of the same which combine a great strength of the roller with a possibility of an automatic manufacture in order to avoid the two most important disadvantages experienced in relation to the known rollers. This is accomplished by the arrangement that each end cover of the roller comprises two annular members with U-shaped cross sections of sheet material, the upright sides of each U-section being parallel to the axis of the roller, the insides being secured to the respective trunnion, the outsides being connected both with each other and with the jacket. Thus each trunnion is connected with the jacket at two locations, so that the spare parts for the rollers can be prefabricated.

The outsides of the annular members or sections are longer than the insides, so that a sufficient contact area with the jacket is obtained. Moreover the two points of support of each trunnion are spaced such with respect to each other that the strength is increased.

The invention relates in another aspect to a method of manufacturing the roller described hereinbefore. This method has caused problems, owing to the fact that the operation of applying the foam plastic filling cannot be carried out last of all, since at least one or more welding operations should still be effected which may cause a melting of the foam plastic filling. According to the present invention the following steps are made:

First the end covers are produced by welding initially one and thereupon the other annular section to the respective trunnion. In the base of each section there are two diametrical holes. Subsequently the end covers are welded to the jacket whereupon the hollow roller is given an inclined position, while a two components mixture of expandible plastic is introduced into the roller until same is completely filled; finally the outer holes are closed.

After filling and expansion of the mixture, manufacturing the roller is almost completed. Only a last welding operation is required, to wit closing the outer holes. The influence exerted on the foam plastic filling by the inevitable increase of temperature is thus limited to a part of the area which is enclosed by the two annular sections, so that the complete contents of the roller keeps its original strength.

SURVEY OF THE DRAWINGS:

FIGS. 1 and 2 show a longitudinal section through the end zone of two embodiments of the roller according to the invention;

Figure 3:
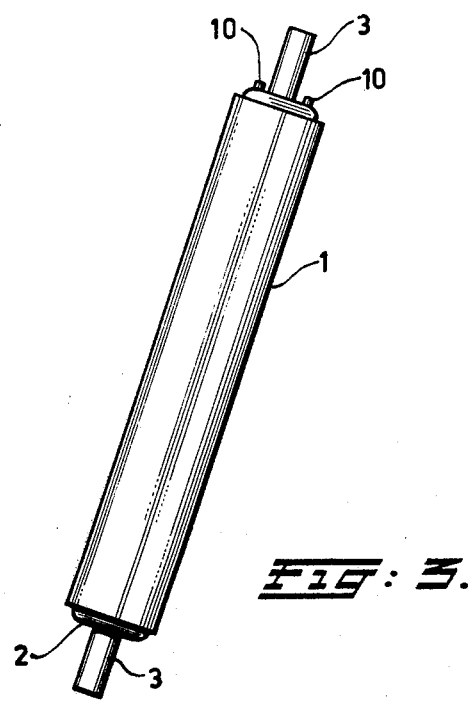
FIG. 3 shows an intermediate phase of the method.

DESCRIPTION OF PREFERRED EMBODIMENTS:

The roller shown in the drawing comprises a stainless steel jacket 1 with two end covers 2 each having a supporting trunnion 3. The roller further has a filling 4 of foam plastic, entirely filling its interior. Owing to the expansion, the filling is under a considerable pressure. Consequently the roller retains its shape perfectly and is light in weight when compared with a known roller, entirely made of metal.

Each end cover 2 which is likewise made of stainless steel consists of two U-shaped annular members 5, 6 of sheet metal. Each member is provided with upright sides 5', 5" and 6', 6" positioned parallel to the axis 7 of the roller. The inner sides 5', 6' are secured to a respective trunnion 3, and the outer sides 5", 6" are both connected with each other and with the jacket 1. These outer sides 5", 6" of the annular members or sections are longer than the inner sides 5', 6'.

In the embodiment of FIG. 1 sections 5 and 6 are identical, while the jacket 1 bears on the sides 5", 6". In the modified embodiment of FIG. 2 the outside diameter of the inner annular section 6 equals the inside diameter of both the jacket 1 and the other annular section 5. This embodiment presents manufacturing advantages as can be read hereinafter, when the present method for manufacturing the roller is described. Said manufacture implies, as a matter of fact that the sections 5, 6 of one of the end covers are provided with two diametrical holes 8, and 9, the holes 8 of which are closed by means of a small welded plate or locking plate 10.

The process of manufacture of the present roller can be automized to a considerable extent. The first steps consist of assembling the end covers 2. For that purpose the inner section 5 is welded by its side 5', at the location 11 to the trunnion 3. Hereafter the inner section 6 is slid on the trunnion, the side 6' pointing in the direction of side 5'. The section 6 is thereupon welded at the location 12 to the trunnion 3 so that seemingly a box structure is formed. In the embodiment of FIG. 1 a circular weld 13 is then applied between the front edges of sides 5", 6", which are directed toward each other. When in this way two end covers 2 have been completed, they are slid into the jacket 1 and subsequently welded thereto at the location 14.

In the embodiment of FIG. 2 the two latter welding operations are combined, owing to the difference in outside diameter between sides 5" and 6". Prior to the formation of weld 12, section 6 is slightly slid into section 5, so that a small overlap between sides 5" and 6" is formed.

The roller can be assembled by means of two end covers manufactured in this way, the jacket 1 abutting against the edge of side 5". At this location a weld 15 can now be formed which can be considered to be a combination of welds 13 and 14 of the embodiment according to FIG. 1. In the modification of FIG. 2 the trunnion 3 can be provided with a layer 16 of corrosion resistant material. It should be noted that all welded joints 11-15 can be formed mechanically.

The next phase of the method is shown in FIG. 3, the hollow roller being set to an inclined (almost upright) position. The end cover with holes 8, 9 is then lying at the upper end of the roller. A two components mixture of expandible synthetic material (for example a product of SCHOLTEN-FOXHOL) is introduced through one of the holes into the interior of the roller. The expansion starts immediately and the supply of mixture is continued until the material issues from the other hole. At that moment the supply is stopped and the two holes 8 are closed by means of a small plate or another closing member 10, whereas the holes 9 stay open. In the two embodiments of FIGS. 1 and 2 the closing plate 10 is welded in the hole 8, so that the foam plastic filling 4 will melt at that point and change its original condition. As a consequence of the box-shaped structure of the end covers 2, this weakening of the filling will remain local and not influence the remaining filling which is under a considerable pressure.

It will be clear that the present invention provides a considerable simplification and economy. First the strength with which the trunnion 3 is secured to the end cover is considerable; one need by no means rely on the strength of the foam plastic filling 4.

Secondly a simplified automized manufacture gets possible, for which the present structure is very suitable.

What I claim is:

1. A roller for guiding and/or conveying a web of material, like in a textile processing machine, said roller comprising a jacket of stainless steel with a filling of foam plastic and two end covers each provided with a trunnion, wherein each end cover of the roller comprises two annular members with U-shaped cross-sections of sheet material, the upright sides of each U-section being parallel to the axis of the roller, the insides being secured to the respective trunnion the outsides being connected both with each other and with the jacket.

2. The roller as defined in claim 1, wherein the outsides of the annular sections are longer than the insides.

3. A roller as defined in claim 2, wherein the outside diameter of the the more inwardly located annular section equals the inside diameter of both the jacket and the other annular section.

* * * * *